United States Patent [19]

Valayil et al.

[11] Patent Number: 4,525,759

[45] Date of Patent: Jun. 25, 1985

[54] ALUMINUM STORAGE DISC

[75] Inventors: Silvester P. Valayil, Shrewsbury; Vita Aronson, Worcester, both of Mass.

[73] Assignee: Shipley Company Inc., Newton, Mass.

[21] Appl. No.: 595,927

[22] Filed: Apr. 2, 1984

[51] Int. Cl.³ .............................................. G11B 5/82
[52] U.S. Cl. ..................................... 360/135; 204/41; 204/42; 428/469; 428/629; 428/650; 428/667; 428/694
[58] Field of Search ....................... 204/42, 41, 33, 23; 428/650, 652, 469, 629, 667, 694; 360/135; 427/131, 132

[56] References Cited

U.S. PATENT DOCUMENTS

| | | | |
|---|---|---|---|
| Re. 28,506 | 8/1975 | Quaintance et al. | 428/203 |
| 3,466,156 | 9/1969 | Peters et al. | 428/579 |
| 3,886,052 | 5/1975 | Smith | 204/33 |
| 4,021,592 | 5/1977 | Fromson | 428/209 |
| 4,109,287 | 8/1978 | Kawai et al. | 360/131 |
| 4,239,835 | 12/1980 | Iijima et al. | 428/611 |
| 4,405,677 | 9/1983 | Chen | 428/172 |
| 4,430,387 | 2/1984 | Nakagawa et al. | 428/579 |
| 4,431,707 | 2/1984 | Burns et al. | 428/629 |

FOREIGN PATENT DOCUMENTS

| | | | |
|---|---|---|---|
| 89896 | 8/1974 | Japan | 204/42 |
| 14546 | 2/1975 | Japan | 204/42 |
| 56028 | 5/1977 | Japan | 204/42 |
| 958488 | 5/1964 | United Kingdom | 204/42 |

OTHER PUBLICATIONS

A. Akiyama et al., Plating, vol. 38, No. 6, pp. 594–598, (1971).
D. S. Lashmore, Plating & Surface Finishing, pp. 48–51, Apr. 1981.

*Primary Examiner*—G. L. Kaplan
*Attorney, Agent, or Firm*—Robert L. Goldberg

[57] ABSTRACT

A process for the metal plating of aluminum comprising the steps of electrolytically anodizing the surface of the aluminum, immersing the anodized aluminum into an electrolytic plating solution and initiating deposition by passing a current through the solution for a time sufficient to form a layer of metal over the aluminum. The process is especially useful for the formation of aluminum storage discs where the electrolytic metal is a single layer of a ferromagnetic metal.

7 Claims, 1 Drawing Figure

ALUMINUM STORAGE DISC

BACKGROUND OF THE INVENTION

1. Introduction

This invention relates to electroplating of aluminum and more particularly, to an inexpensive process for the manufacture of aluminum storage discs by an electroplating process and to an improved aluminum storage disc formed by said process.

2. Description of the Prior Art

Electrolytic metal deposition refers to the plating of a metal over a surface by passing a current through an electrolyte where the part to be plated is a cathode and the metal to be plated is typically an anode. Processes and compositions useful therefor are known, are in substantial commercial use and are described in numerous publications. Electroplating formulations and processes are disclosed in Muller et al, Plating on Plastics, Robert Draper Ltd. Teddington, 2nd Ed., 1971, Chapter 17, incorporated herein by reference.

The plating of aluminum for a variety of purposes, including the manufacture of magnetic storage discs, is also well known in the art. An early patent showing a process for the formation of an aluminum storage disc by plating is U.S. Pat. No. 3,466,156, incorporated herein by reference. In this patent, following cleaning of the aluminum disc, the disc is plated by a procedure including the steps of formation of a zinc coating by a zincating process, electroless deposition of a hard, non-metallic nickel layer which serves as a hard base layer and then, electroless deposition of a thin film of cobalt metal as the recording medium. The process is undesirable because it includes multiple steps, uses a zincating solution which is toxic and difficult to dispose of following treatment and provides a recording disc having poor adhesion between the aluminum disc and the subsequently applied metal coating.

More recent processes for plating aluminum include electrical anodizing of the aluminum surface in lieu of zincating. Following anodizing, the anodized coating is electroplated with multiple layers of metals. One patent showing such a process is U.S. Pat. No. 3,886,052, incorporated herein by reference. This patent teaches the preparation of a magnetic recording disc by a process including the steps of electrical anodizing followed by electroplating with copper, polishing the copper plate to provide a smooth surface and then electroplating with a ferromagnetic material, such as a nickel-cobalt alloy.

Another patent showing the plating of aluminum using a step of electrical anodizing of the aluminum is U.S. Pat. No. Re. 28,506 directed to the use of indicia-bearing anodized layers, but not to the formation of magnetic recording discs. In this patent, an aluminum surface is anodized and then plated by an electroless plating process including the steps of contact with a plating catalyst followed by direct electroless metal deposition from any of a variety of electroless metal plating solutions.

A more recent patent showing the plating of aluminum using an anodized coating is U.S. Pat. No. 4,021,592, incorporated herein by reference. This patent is not directed to the formation of magnetic storage discs. In the patent, an aluminum web is anodized and then briefly electroplated with any of a variety of metals to form a discontinuous electroplated surface. Plating is intentionally discontinued before a continuous film of metal is deposited over the anodized layer. The discontinuous film acts as a anchor layer for subsequently applied coatings. Coatings that are suggested for deposition over the anchor layer include photoresists, various plastics, electrolytically plated metals differing from the anchor coat, etc. A process of electroless metal plating is also suggested in this patent. In this process, the aluminum web having the anchor layer is laminated to a plastic substrate with the anchor layer in contact with the plastic. It is intended in the patent that the laminating process embed the anchor layer into the surface of the plastic. In this way, the plastic is secured to the web through the anchor layer. The aluminum layer and the anodized layer are then etched away, leaving the anchor layer embedded in the plastic. The discontinuous isolated deposits of the anchor layer then serve as nucleating sites for electroless metal deposition.

From the above discussion, it can be seen that there are many processes available for the plating of aluminum for a variety of purposes, including the formation of magnetic recording discs. However, all processes involve multiple steps and improved adhesion between an aluminum substrate and a deposited metal is still desired.

SUMMARY OF THE INVENTION

The subject invention is a simplified process for the plating of aluminum with a variety of electroplated metals and is especially useful for the manufacture of aluminum recording storage discs.

The invention comprises the steps of cleaning an aluminum substrate in a conventional manner, anodizing, preferably in a manner where an anodized surface is obtained having discrete small islands separated from each other, and electroplating of a metal, preferably a ferromagnetic metal for the preferred embodiment of the invention directed to the formation of storage discs. Plating is initiated by passing a current through the solution. Plating is continued for a time sufficient to permit a metal plate of desired thickness to form. By the process of the invention, aluminum may be coated with a single layer of a desired metal in a process utilizing a minimum of steps, or alternatively, multiple coatings may be formed if desired.

The subject invention is especially useful in the manufacture of aluminum storage discs where the metal coat is of a ferromagnetic material such as cobalt or a nickel-cobalt alloy. It is an unexpected discovery of the invention that the discs manufactured by the process of the invention appear to have a greater storage capacity than prior art storage discs. The reason for the greater capacity is that the metal deposit is formed vertically from the surface of the aluminum disc and this vertical structure is capable of greater storage capacity.

DESCRIPTION OF THE DRAWING

The drawing is a photomicrograph showing an anodized surface prepared in accordance with the invention prior to plating with a desired metal.

DESCRIPTION OF THE PREFERRED EMBODIMENT

Figure 1:
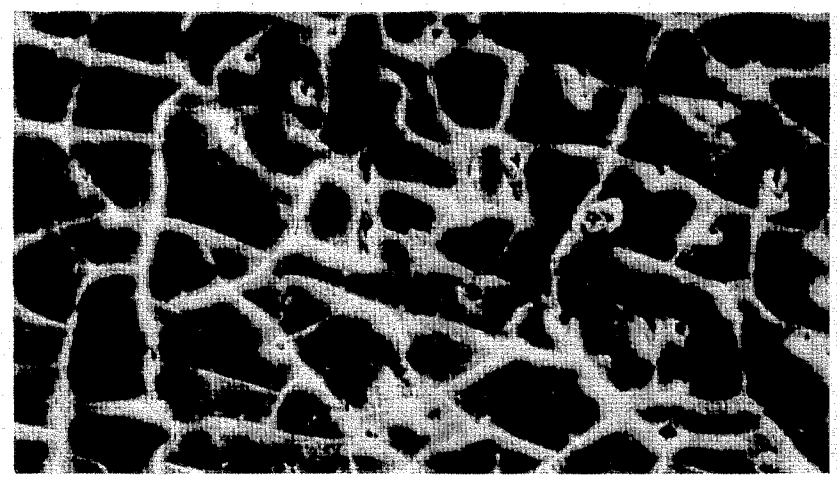

In accordance with art recognized processes for the manufacture of aluminum storage discs, the aluminum supporting substrate is typically turned on a lathe and polished so that the surface of one or both sides has a smoothness on the order of ½ to 5 microinches in roughness. During this operation, the disc is turned flat such that any bows in the surface are no larger then 25 to 150 microinches per inch as measured over the surface. After the disc has been turned and polished, the outer surface takes on a smooth configuration but typically includes small pockets of alloying constituents, or precipitates lying at the surface and immediately beneath the surface. These precipitates may be removed to obtain uniform adhesion between the disc and the subsequent metal plate.

The next step in the process involves cleaning the substrate with a soap cleaner such as Diversey 17 or Alded soap cleaner. Cleaning can take place at a somewhat elevated temperature, preferably ranging between about 100° F. and 140° F. for from 2 to 5 minutes.

The aluminum substrate is then immersed in an acid solution to remove contaminants such as a phosphoric acid or a nitric acid solution for a time of 30 seconds to 2 minutes at room temperature or at a slightly elevated temperature.

The next step in the process comprises anodizing the surface of the aluminum. The anodizing of aluminum is a well known process and procedures for anodizing are disclosed in numerous publications including "The Surface Treatment and Finishing of Aluminum and Its Alloys" by S. Wernick and R. Pinner, published by R. Draper, Teddington, England (1956 and 1959), incorporated herein by reference. These procedures typically comprise immersion of the aluminum surface in a aqueous solution of an oxidizing acid such as phosphoric acid, oxalic acid, sulfuric acid, or mixtures thereof, etc., with the aluminum substrate to be anodized as the anode and then passing a current through the solution for a time sufficient to form an anodized layer of sufficient thickness.

The anodizing process of the prior art, as described above, provides an unsealed aluminum oxide layer over the aluminum which, on a microscopic level, has cracks propagating throughout its surface that define isolated or discrete islands of oxide isolated from each other and separated by cracks. This is shown in the drawing which is photomicrograph of an anodized surface at a 500X magnification with cracks separating oxide islands from each other.

It is a discovery of the subject invention that a plated metal deposits on the surface of the anodized part in a vertical crystal structure conforming to the shape and size of the oxide island on the anodized surface. Consequently, a smaller oxide island will produce a metal crystal of reduced cross-section extending vertically from the aluminum oxide surface. A metal plate of this nature - of elongated vertical grains of reduced cross-section, leads to a greater storage capacity for information stored in the disc. The drawing is a photomicrographic reproduction of an aluminum part prepared by the process of Example 1 below.

A fine oxide structure is obtained by an anodizing process using a higher than conventional current density, preferably in a sulfuric acid electrolyte. The electrolyte is preferably a sulfuric acid solution in a concentration of from 10 to 40 percent by volume and preferably varies between about 15 and 25 percent by volume. Current density is preferably at least 8 amps per square foot and more preferably varies between 8 and 45 amps per square foot with a range of 12 to 20 amps per square foot comprising the most preferred range for purposes of the invention. Anodizing conditions are those necessary to provide an adequate base for plating and this may be accomplished within an anodizing time of from about 5 to 10 minutes in an electrolyte at a temperature of between 25 and 40° C.

Following anodizing of the aluminum substrate, and a routine water rinse, the anodized surface may be plated with metal. Any electrolytic plating solution known to the art may be used. Therefore, the aluminum may be plated with copper, nickel, cobalt, etc.

For the formation of an aluminum storage disc, the part is plated with a ferromagnetic material such as cobalt or a cobalt-nickel alloy. A process of this nature is disclosed in U.S. Pat. No. 3,886,052 referenced above. The electrolytic metal may be deposited to any desired thickness and deposit thickness is regulated by the time of plating. The aluminum storage disc serves as the cathode. A suitable material such as a cobalt, a cobalt/nickel alloy or two electrodes, one of cobalt and one of nickel serves as the anode. A current is passed through the electrolyte for a time sufficient to deposit metal to a desired thickness. Using a current density of from 2 to 7 amps per square foot, within about 1 to 15 minutes, a layer of metal of sufficient thickness will deposit over the aluminum anodized surface.

The metal deposited from solution will have a vertical structure conforming in shape to the oxide island over which it is deposited.

The process of the invention significantly reduces the number of procedural steps required in the plating of aluminum and the manufacture of aluminum storage discs. Following anodizing, which procedure is in accordance with prior art methods as adapted for purposes of the invention, only a single plating step is involved. The aluminum part is racked for plating as a a cathode, immersed in a plating bath, current is passed through the bath for a sufficient period of time and then turned off without the need for passing the aluminum part to a separate plating tank or through multiple plating steps. This simplified process is in contrast to prior art processes where either multiple coating steps are required or alternatively, for electroless metal deposition, the aluminum surface must be prepared for deposition by any of a number of steps including activation, catalysis and acceleration.

Notwithstanding the above, it is not intended that multiple coatings be excluded from the scope of the invention. For specific purposes, multiple coatings may be desired. For example, in the decorative arts, aluminum might have a first coating of copper followed by a coating of chromium or some other specialty metal.

The invention will be better understood by reference to the examples which follow:

EXAMPLE 1

For purposes of this Example, an aluminum storage disc substrate was used. The disc had a mirrored surface and had a size of 5¼ inches in diameter by 70 mils in thickness. The disc was first immersed in a soak cleaner identified as Alded Soak Cleaner, available from Shipley Company Inc. of Newton, Massachusetts. The Alded solution wa maintained at 120° F. and the aluminum disc was immersed in the solution for 60 seconds. The disc was removed from solution and rinsed in a fifty percent solution of nitric acid for 30 seconds. The disc was then racked as an anode in an anodizing tank containing a 20 volume percent solution of sulfuric acid maintained at 35° C. An aluminum bar was used as a cathode. A current of 9 amps per square foot was passed through the solution for 7 minutes to form an anodized layer over the aluminum disc. The part is then water rinsed. The aluminum storage disc having the anodized surface is depicted in the drawing described above.

Following the above procedure, the part is ready for electroplating. Any conventional electroplating solution may be used. Plating is continued until a deposit of desired thickness is obtained. A typical procedure would involve racking the aluminum disc as a cathode in a cobalt plating solution maintained at about 90° C. A cobalt bar may be used as an anode. A current of 3 amps per square foot would be passed through the solution for about 10 minutes.

Following plating and water rinsing, the part may be heat treated at a temperature of 200° C. for 2 hours in an air circulating oven having an inert atmosphere. The procedures of this example constitutes the preferred embodiment of the invention.

The procedure of Example 1 may be repeated at current densities of 18 and 45 amps per square foot for the anodizing step with similar results except that the oxide islands would, on average, have a reduced size.

EXAMPLE 2

The procedure of Example 1 through the step of anodizing was repeated. Following anodizing, a copper plating solution may be substituted for the cobalt plating solution. Following copper plating, the aluminum may be plated with chromium to provide a decorative finish.

We claim:

1. A metal plated aluminum storage disc comprising an aluminum storage disc substrate, an electrically anodized oxide layer over at least a surface of said aluminum storage disc substrate, said anodized oxide layer having cracks propogating throughout its surface which cracks define discrete oxide islands separated from each other by said cracks, and a layer of electrolytically deposited ferromagnetic metal over said discrete oxide islands, said ferromagnetic metal being columnar in structure conforming in size and shape to said oxide islands and extending upwards from said islands.

2. The aluminum storage disk of claim 1 where the anodized oxide layer is formed at a current density of at least 8 amps per square foot.

3. The aluminum storage disk of claim 2 where the electrolyte is a sulfuric acid solution in a concentration of from ten to forty percent by volume and the current density varies between about 12 and 20 amps per square foot.

4. The aluminum storage disc of claim 2 characterized by the ferromagnetic metal layer being a single metal layer.

5. The aluminum storage disc of claim 2 where the metal layer is selected from the group of cobalt and colbalt-nickel alloys.

6. The aluminum storage disc of claim 5 where the metal layer is cobalt.

7. The aluminum storage disc of claim 5 overcoated with a second metal.

* * * * *